July 6, 1943.　　J. H. HANSELMAN　　2,323,536
SUCTION FAN
Filed March 25, 1941　　3 Sheets-Sheet 2
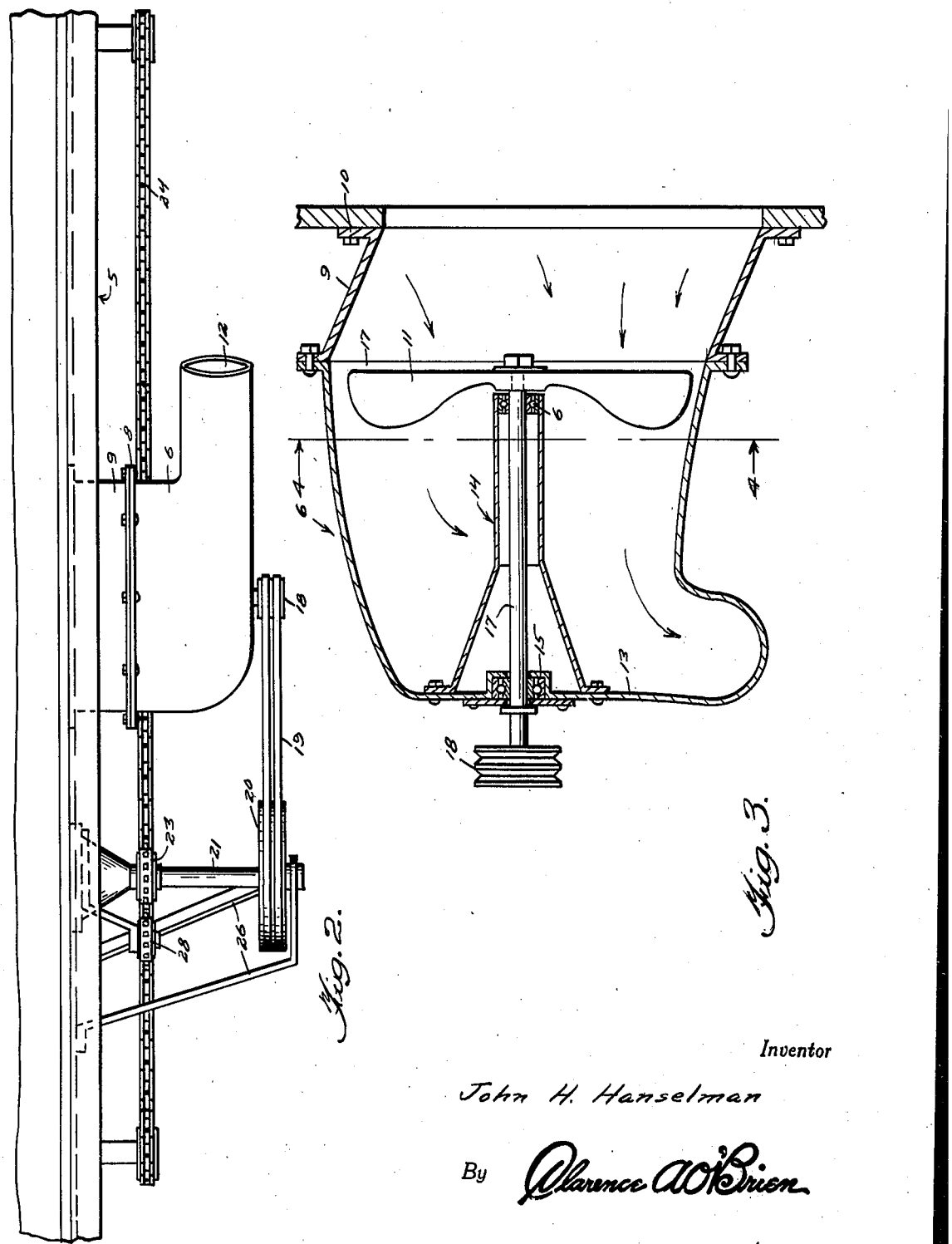
Inventor
John H. Hanselman
By Clarence A. O'Brien
Attorney July 6, 1943.  J. H. HANSELMAN  2,323,536
SUCTION FAN
Filed March 25, 1941   3 Sheets-Sheet 3

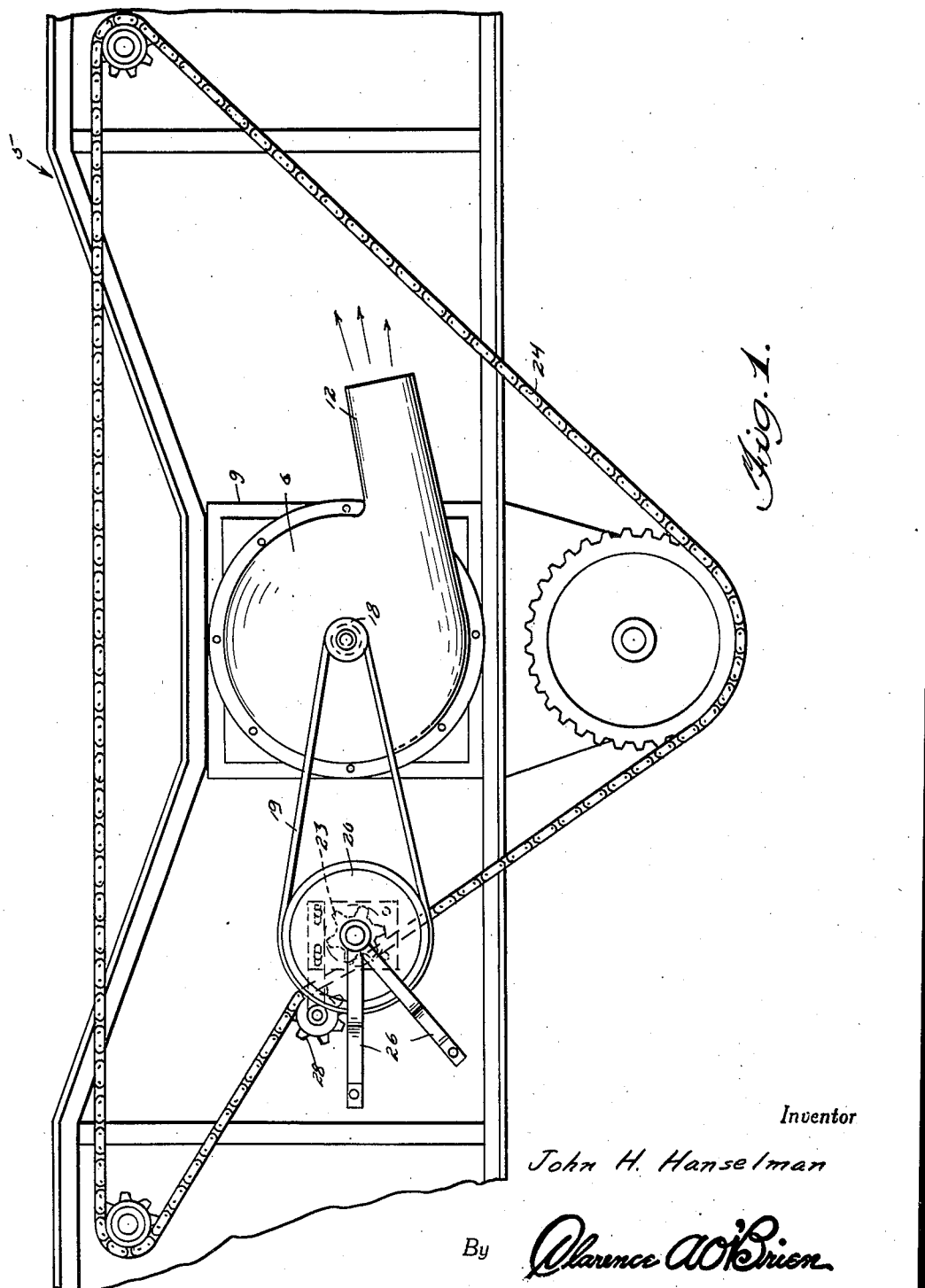

Inventor
John H. Hanselman
By Clarence A. O'Brien
Attorney

Patented July 6, 1943

2,323,536

UNITED STATES PATENT OFFICE 2,323,536

SUCTION FAN

John H. Hanselman, Des Moines, Iowa

Application March 25, 1941, Serial No. 385,187

1 Claim. (Cl. 230—120)

This invention relates to a corn cleaning device for corn pickers or harvesters and the primary object is the provision of a device of this character which may be easily and quickly installed on a corn harvester now in use for pneumatically removing silk, parts of husks, leaves, etc. from the corn after being husked and prior to delivery to a carrier for storage so that the corn will be free of foreign matter or refuse and be in a clean state permitting a great amount of corn to be accommodated within a given area and also allows the corn to be harvested in dry weather instead of delaying such operation until moist weather as now customary and practically necessary if corn picking is to be carried out with any success.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation illustrating a portion of a corn harvester equipped with a corn cleaning device constructed in accordance with my invention.

Figure 2 is a fragmentary top plan view illustrating the same.

Figure 3 is a vertical transverse sectional view illustrating a suction fan and its housing and the mounting thereof onto the corn harvester.

Figure 4:
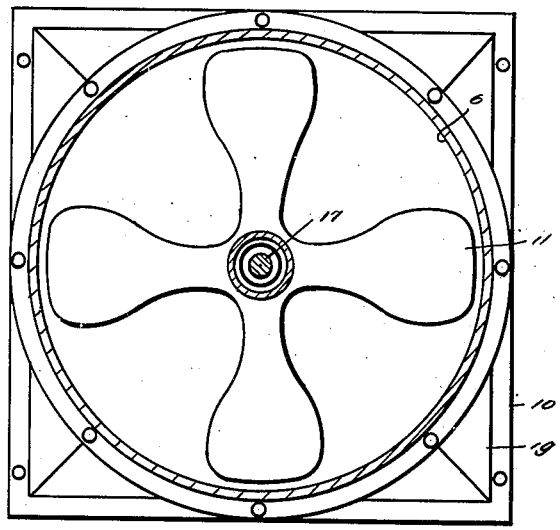
Figure 4 is a sectional view taken on the line 4—4 of Figure 3.
Figure 5:
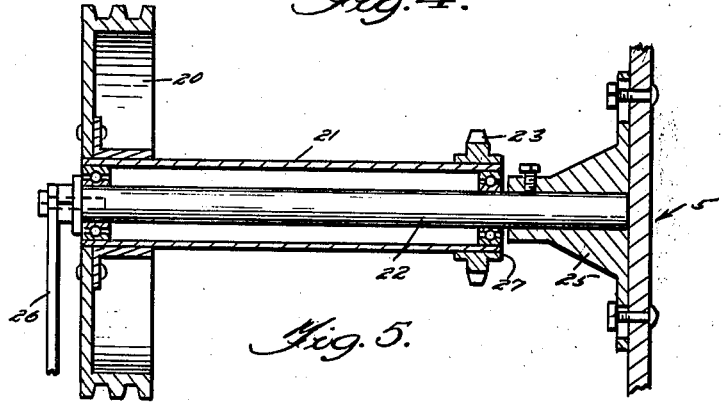
Figure 5 is a vertical sectional view illustrating a portion of the drive mechanism for the present invention.
Figure 6:
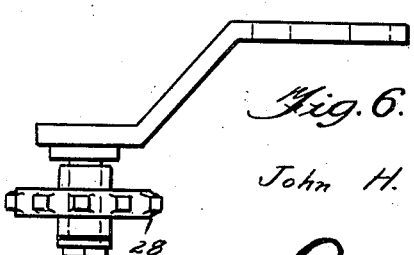
Fig. 6 is a view of the idler sprocket gear and support therefor.

Referring in detail to the drawings, the numeral 5 indicates a fragmentary portion of a corn harvester or picker and of the type including husking rollers (not shown) for the purpose of removing the husks from the corn prior to delivery of said corn to a conveyance traveling in unison with the picker. As the corn leaves the husking rollers it still contains foreign matter and also corn silk, particles of husks and leaves. To assure of the removal of loose materials from the corn prior to their delivery to the conveyance, the present invention is adapted to the harvester by removing from the harvester a cover plate located usually adjacent the husking rollers and securing in place thereof a fan housing 6 including a comparatively large sized mouth 7 surrounded by a marginal flange 8 and an adapter 9 bolted to the flange 8 and to the walls of the harvester, as shown at 10. The purpose of the adapter 9 is to position the fan housing 6 on the harvester so as not to interfere with any of the conventional parts of the harvester and to locate the fan, indicated by the character 11, sufficiently close to the husking rollers (not shown) of the harvester as to draw a blast of air over the corn as it is husked to remove the foreign matter therefrom prior to the corn reaching the usual elevator or conveyor of the harvester for deliverance into the conveyance for storage.

The fan housing 6 includes a laterally disposed discharge neck 12 located substantially opposite the mouth 7 of the fan housing. The fan housing 6 further includes an end wall 13 arranged opposite the mouth 7 on which is removably mounted a supporting sleeve 14. The end wall 13 also carries an anti-friction bearing 15 cooperative with an anti-friction bearing 16 in the sleeve 14 in rotatably supporting a fan shaft 17 to which the fan 11 is secured close to the mouth 7 of the housing 6.

The fan shaft 17 extends outwardly of the housing and is equipped with the belt pulley 18 adapted to be belted by a plurality of belts 19 to a pulley 20 secured on a jack shaft 21.

The jack shaft is rotatably supported by a stub shaft 22. The jack shaft 21 is in the form of a sleeve to which the pulley 20 is secured and also a sprocket gear 23 to mesh with a drive sprocket chain 24 of the harvester.

One end of the stub shaft 22 is removably secured in a bracket 25 secured on the harvester while the other end of the stub shaft is supported by braces 26 also secured on the harvester.

Anti-friction bearings 27 are provided between the stub shaft 22 and the jack shaft 21.

An idle sprocket gear 28 engaging the sprocket chain 24 is adjustably mounted on the harvester adjacent the jack shaft for guiding the sprocket chain into engagement with the sprocket gear 23.

From the foregoing description taken in connection with the accompanying drawings it will be seen that a very practical pneumatic device has been provided readily adaptable to a harvester adjacent the husking rollers thereof for removing foreign matter from corn after being husked and delivering said foreign matter to the atmosphere, permitting the corn to pass as usual from the harvester to a carrier free of foreign matter. Further it will be seen that the present invention owing to its arrangement of parts can be conveniently driven from one of the sprocket chains of the harvester. Also it is to be understood that in some types of harvesters the fan housing 6 may be bolted directly onto the harvester and the adapter 9 eliminated.

While I have shown and described the preferred embodiment of my invention, it will be understood that minor changes in construction, combination and arrangement of parts may be made without departing from the spirit and scope of the invention as claimed.

Having thus described my invention, what I claim is:

Apparatuses for use in drawing foreign matter out of an opening in one side of a corn harvester, said apparatus comprising a fan housing having a discharge neck at one end thereof and an intake mouth at its opposite end, an adapter extending from said mouth for mounting said housing on said side of the harvester opposite said opening, a fan shaft mounted in said housing to extend through said one end thereof to said mouth, a suction fan fast on said shaft adjacent said mouth, the mounting for the fan shaft comprising a sleeve carried by said one end of the fan housing and extending into the housing in surrounding relation to said shaft, said sleeve having a bearing assembly therein adjacent the fan for supporting said shaft, and a bearing assembly in said one end of the housing and surrounded in said housing by said sleeve.

JOHN H. HANSELMAN.